(12) United States Patent
McKimm

(10) Patent No.: US 9,370,194 B2
(45) Date of Patent: Jun. 21, 2016

(54) METHOD AND APPARATUS FOR SLAUGHTERING OF FISH

(71) Applicant: SMITH-ROOT, INC., Vancouver, WA (US)

(72) Inventor: Robin McKimm, Donaghadee County Down (GB)

(*) Notice: Subject to any disclaimer, the term of this patent is extended or adjusted under 35 U.S.C. 154(b) by 0 days.

(21) Appl. No.: 14/894,679

(22) PCT Filed: Jun. 5, 2013

(86) PCT No.: PCT/EP2013/061599
§ 371 (c)(1),
(2) Date: Nov. 30, 2015

(87) PCT Pub. No.: WO2014/194946
PCT Pub. Date: Dec. 11, 2014

(65) Prior Publication Data
US 2016/0120193 A1  May 5, 2016

(51) Int. Cl.
*A22B 3/00* (2006.01)
*A22B 3/06* (2006.01)
*A22B 3/08* (2006.01)

(52) U.S. Cl.
CPC .. *A22B 3/06* (2013.01); *A22B 3/083* (2013.01)

(58) Field of Classification Search
CPC ............. A22B 3/00; A22B 3/06; A22B 3/083
USPC ................................ 452/52, 57–59
See application file for complete search history.

(56) References Cited

U.S. PATENT DOCUMENTS

| | | | |
|---|---|---|---|
| 357,019 A | 2/1887 | Merell et al. | |
| 1,292,246 A | 1/1919 | Burkey | |
| 1,515,547 A | 11/1924 | Burkey | |
| 1,974,444 A | 9/1934 | Burkey | |
| 2,778,140 A | 3/1953 | Applegate et al. | |
| 2,764,832 A | 8/1955 | Kreutzer | |
| 2,808,674 A | 10/1957 | Vang | |
| 2,832,168 A | 4/1958 | Brown | |
| 2,836,735 A | 5/1958 | Kreutzer | |
| 3,011,316 A | 12/1958 | Wilson | |
| 2,879,539 A * | 3/1959 | Cervin | A22B 3/06 452/58 |
| 2,991,421 A | 7/1961 | Volz | |
| 3,012,271 A * | 12/1961 | Morse | A22B 3/06 452/58 |
| 3,110,978 A | 11/1963 | Kreutzer | |
| 3,415,001 A | 12/1968 | Ott et al. | |
| 3,484,665 A | 12/1969 | Mountijoy | |
| 3,487,645 A | 1/1970 | Frankel | |
| 3,491,474 A | 1/1970 | Metcalf, Jr. | |
| 3,683,280 A | 8/1972 | Metcalf, Jr. | |
| 3,693,276 A | 9/1972 | Kurc | |
| 3,797,459 A | 3/1974 | Harris | |
| 3,865,663 A | 2/1975 | Oka | |

(Continued)

*Primary Examiner* — Richard Price, Jr.
(74) *Attorney, Agent, or Firm* — J. Curtis Edmondson; Law Offices of J. Curtis Edmondson

(57) ABSTRACT

A method of slaughtering fish comprising the steps of providing an elongated passage, passing fish entrained within a flow of water through said passage, and generating linear electric field in the water along at least a first region of said passage, thereby inducing electro-anaesthesia or stunning of the fish passing through said first region of the passage, and applying a further electric field in the water in a subsequent region of the passage, downstream of said first region, to kill the fish such that the fish exit a downstream end of said passage in a dead state.

18 Claims, 3 Drawing Sheets

(56) References Cited

U.S. PATENT DOCUMENTS

| | | | |
|---|---|---|---|
| 4,029,049 A | 6/1977 | Hillier | |
| 4,197,423 A | 4/1980 | Fusen | |
| 4,211,980 A * | 7/1980 | Stowell | H04B 13/02 |
| | | | 119/220 |
| 4,417,301 A | 11/1983 | Newman | |
| 4,481,904 A | 11/1984 | Fletcher | |
| 4,509,285 A | 4/1985 | Smith | |
| 4,580,525 A | 4/1986 | Marzluf | |
| 4,593,648 A | 6/1986 | Marzulf | |
| 4,672,967 A | 6/1987 | Smith | |
| 4,688,024 A | 8/1987 | Gadde | |
| 4,713,315 A | 12/1987 | Smith | |
| 4,723,511 A | 2/1988 | Solman et al. | |
| 4,750,451 A | 6/1988 | Smith | |
| 4,825,810 A | 5/1989 | Sharber | |
| 4,862,427 A | 8/1989 | Almagor et al. | |
| 4,888,703 A | 12/1989 | Baba et al. | |
| 4,949,317 A | 8/1990 | McQuiltty et al. | |
| 4,963,035 A | 10/1990 | McCarthy et al. | |
| 4,982,384 A | 1/1991 | Pipkin et al. | |
| 5,111,379 A | 5/1992 | Sharber et al. | |
| 5,123,195 A | 6/1992 | Hawkins | |
| 5,168,473 A | 12/1992 | Parra | |
| 5,214,873 A | 6/1993 | Sharber | |
| 5,233,782 A | 8/1993 | Sharber et al. | |
| 5,253,610 A | 10/1993 | Sharber | |
| 5,266,245 A | 11/1993 | Wellings | |
| 5,270,912 A | 12/1993 | Sharber et al. | |
| 5,305,711 A | 4/1994 | Sharber | |
| 5,311,694 A | 5/1994 | Sharber et al. | |
| 5,327,668 A | 7/1994 | Sharber et al. | |
| 5,327,854 A | 7/1994 | Smith et al. | |
| 5,341,764 A | 8/1994 | Sharber | |
| 5,341,768 A * | 8/1994 | Pope | F24J 3/003 |
| | | | 122/26 |
| 5,343,442 A | 8/1994 | Vielberth | |
| 5,445,111 A | 8/1995 | Smith | |
| D362,166 S | 9/1995 | Wall | |
| 5,448,968 A * | 9/1995 | Ostlie | A01K 79/02 |
| | | | 119/220 |
| 5,460,123 A | 10/1995 | Kolz | |
| 5,511,335 A | 4/1996 | Langer | |
| 5,551,377 A * | 9/1996 | Sharber | A01K 79/02 |
| | | | 119/220 |
| 5,566,643 A | 10/1996 | Charter et al. | |
| 5,644,863 A | 7/1997 | Verburg | |
| 5,657,964 A | 8/1997 | Yoshida | |
| 5,732,931 A | 3/1998 | Masse | |
| 5,778,591 A | 7/1998 | Oschman et al. | |
| 5,782,033 A | 7/1998 | Park et al. | |
| 5,795,099 A | 8/1998 | Parker | |
| 5,816,196 A | 10/1998 | Webster et al. | |
| 5,879,105 A | 3/1999 | Bishop et al. | |
| D422,672 S | 4/2000 | Rich | |
| 6,132,303 A | 10/2000 | Buckhaven | |
| 6,134,824 A | 10/2000 | Gleeson | |
| 6,183,356 B1 * | 2/2001 | Middleton | A22B 3/083 |
| | | | 452/196 |
| 6,325,020 B1 | 12/2001 | Guigne | |
| 6,357,390 B1 | 3/2002 | Maehata et al. | |
| 6,415,742 B1 | 7/2002 | Lee et al. | |
| 6,471,576 B1 | 10/2002 | Ross | |
| 6,530,337 B1 | 3/2003 | Hoffman | |
| 6,765,487 B1 | 7/2004 | Holmes et al. | |
| 6,837,182 B2 | 1/2005 | Leblanc | |
| 6,917,294 B2 | 7/2005 | Larsen | |
| 6,978,734 B1 | 12/2005 | Smith et al. | |
| 7,037,183 B1 | 5/2006 | Troyer | |
| 7,174,668 B2 | 2/2007 | Locklear | |
| 7,264,225 B1 | 9/2007 | Griswold | |
| 7,333,395 B2 | 2/2008 | Lewis | |
| 7,476,056 B2 | 1/2009 | Dreyer | |
| 7,507,132 B2 | 3/2009 | Grune et al. | |
| 7,524,140 B2 | 4/2009 | Bishop | |
| 7,572,083 B1 | 8/2009 | Bishop et al. | |
| 7,686,539 B2 | 3/2010 | Aristaghes et al. | |
| D622,806 S | 8/2010 | Hamilton et al. | |
| 7,905,440 B2 | 3/2011 | Ikuta et al. | |
| 7,975,425 B1 | 7/2011 | VanBurch et al. | |
| 8,087,384 B2 * | 1/2012 | Smith | A01K 97/20 |
| | | | 119/228 |
| 8,387,746 B2 | 3/2013 | Parkin | |
| 8,739,736 B2 * | 6/2014 | Holliman | A22B 3/06 |
| | | | 119/215 |
| 2003/0051674 A1 | 3/2003 | Leblanc | |
| 2006/0018833 A1 | 1/2006 | Murphy et al. | |
| 2006/0096547 A1 | 5/2006 | Massey et al. | |
| 2007/0220798 A1 | 9/2007 | Davidson | |
| 2007/0254573 A1 * | 11/2007 | Horst | A22C 21/0061 |
| | | | 452/58 |
| 2008/0295758 A1 | 12/2008 | Glessner et al. | |
| 2009/0025270 A1 | 1/2009 | Orcahrd | |
| 2009/0035220 A1 | 2/2009 | Jones | |
| 2010/0107986 A1 | 5/2010 | Holliman | |
| 2010/0224134 A1 | 9/2010 | Burger et al. | |
| 2010/0242851 A1 | 9/2010 | Carstensen et al. | |
| 2010/0258772 A1 | 10/2010 | Parkin | |
| 2010/0288203 A1 | 11/2010 | Smith | |
| 2010/0313820 A1 | 12/2010 | Holliman | |
| 2011/0031062 A1 | 2/2011 | Elmer | |
| 2011/0091638 A1 * | 4/2011 | Slinde | A22B 3/005 |
| | | | 426/643 |
| 2011/0174231 A1 | 7/2011 | Edondson et al. | |
| 2011/0277693 A1 | 11/2011 | Parkin | |
| 2011/0283592 A1 | 11/2011 | Smith et al. | |
| 2011/0299938 A1 | 12/2011 | Jung et al. | |
| 2013/0008385 A1 | 1/2013 | Smith | |
| 2013/0036653 A1 | 2/2013 | Holliman | |
| 2013/0073239 A1 | 3/2013 | Edmondson | |
| 2014/0254060 A1 | 9/2014 | Malone | |
| 2015/0196012 A1 | 7/2015 | Burger | |
| 2015/0201590 A1 | 7/2015 | Carstensen | |

* cited by examiner

METHOD AND APPARATUS FOR SLAUGHTERING OF FISH

RELATED APPLICATIONS

This application is a 371 of PCT Application No. PCT/EP2013/061599 filed on Jun. 5, 2013 the contents herein incorporated into this application by reference.

BACKGROUND

This invention relates to a method and apparatus for slaughtering fish, and in particular to a method and apparatus for slaughtering fresh water fish, such as trout.

Traditionally, volume farmed fresh water trout have been slaughtered by placing the fish into an ice slurry, causing asphyxiation of the fish. This method is considered to cause excessive pain and suffering to the fish as it may take upwards of 20 minutes for the fish to die. Such method is therefore condemned by most animal welfare organizations and is also unpopular with customers, in particular supermarkets.

More recently, systems have been developed for stunning and killing fish by applying an electric field to the water in which the fish are present. Typically electrodes are placed in the water and connected to an AC supply. However, such methods can cause the fish, in particular trout, to undergo severe muscular contractions leading to broken backs and serious hemorrhaging. Unless the fish are filleted immediately the latter stains the fillet which would be rejected by the customer. The loss can be as high as 30%, which forces the fish farm back to the "straight into ice slurry" method. Staining may not occur until after rigor mortis has elapsed. However, filleting before the onset of rigor mortis causes subsequent gaping in the flesh. The fillet quality is at its best (visually and by taste) when filleting is done after rigor mortis. Some known electric fish stunning devices only subdue the fish, which are then removed to be killed by mechanical means. Others rely on making direct contact between electrodes and the fish to stun the fish, typically once the fish have been removed from the water. This "contact stun" method causes myoclonic jerks in the fish each time the electrodes touch the fish, leading to damage to the fish.

Salmonids, including trout, are particularly vulnerable to damage from the AC waveform. AC has been banned in electric fishing for this reason.

According to a first aspect of the present invention there is provided a method of slaughtering fish comprising the steps of providing an elongated passage, passing fish entrained within a flow of water through said passage, and generating a linear electric field in the water along at least a first region of said passage, thereby inducing electro-anesthesia or stunning of the fish passing through said first region of the passage, and applying a further electric field in the water in a subsequent region of the passage, downstream of said first region, to kill the fish such that the fish exit a downstream end of said passage in a dead state.

Preferably said method comprises providing a plurality of electrodes within said passage, said electrodes being arranged in longitudinally spaced pairs along the passage, and applying a potential difference between the electrodes of one or more electrode pairs in at least a first region of said passage via a DC supply to generate said linear electric field in the water along said at least first region of the passage. Preferably said method comprises applying a pulsed waveform to the electrodes of one or more electrode pairs in said subsequent region of said passage downstream of said first region, preferably at a higher voltage than the DC supply supplied to the electrode pairs in said first region, to generate said further electric field to cause medullary collapse in fish passing through said subsequent region of the passage, during which there is a total loss of gill movement followed by cardiac arrest.

By applying direct current (DC) to the electrode pairs in the at least first region of the passage, thus generating a linear electric field, the fish are stunned and immobilized before they pass into the subsequent region wherein they can be killed without undergoing the severe muscular contractions and resulting damage encountered with known AC fish slaughtering systems.

Preferably said method comprises applying an increasing voltage to subsequent electrode pairs in a downstream direction in said at least first region to generate a voltage gradient along said at least first region of the passage.

Said method may further comprise applying a pulsed DC waveform in a second region downstream of said first region, which may be in addition to the non-pulsed potential difference applied in the first region, and preferably applying a further pulsed DC waveform, preferably at an increased voltage, in a third region, downstream of said second region. According to a second aspect of the present invention there is provided an apparatus for slaughtering fish comprising an elongated passage through which a flow of water containing fish can be passed, a plurality of electrodes being located within said passage, said electrodes being arranged in longitudinally spaced pairs, one or more electrode pairs in a first region of said passage being connectable to a DC supply to generate a linear electric field in the water in said first region to induce electro-anesthesia or stunning of fish passing through said first region of the passage, a plurality of electrode pairs in a subsequent region of the passage, downstream of said first region, being connectable to a power supply, preferably a DC supply, to generate an electric field in the water in said subsequent region to kill the fish, such that the fish exit a downstream end of said passage in a dead state.

Each electrode pair in at least said first region of the pipeline may comprise an upstream negatively charged electrode and a downstream positively charged electrode, such that fish are attracted to the positively charged electrode encouraging the fish to move in a downstream direction through the pipeline. Alternatively the polarity of the respective electrodes of each electrode pair may be reversed if the fish are likely to be moving in a tail first direction. An embodiment of the present invention will now be described by way of example only, with reference to the accompanying drawings, in which:

A fish slaughtering apparatus in accordance with an embodiment of the present invention comprises an elongated semi-flexible (or rigid) pipeline 10 that receives live fish, preferably from as close to the harvesting point as required or possible. The fish are treated humanely and exit the pipeline in a dead condition. (Defined by the humane slaughter association).

Figure 1:
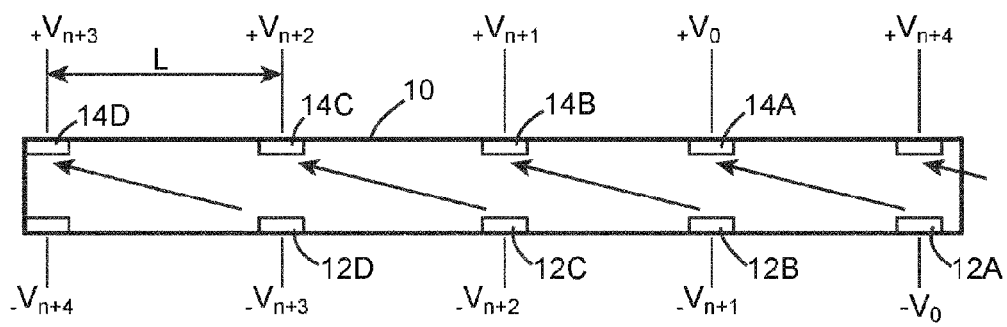
FIG. 1 is a section of a pipeline of a fish slaughtering apparatus in accordance with an embodiment of the present invention showing an electrode arrangement therein.

As illustrated in FIG. 1, a plurality of longitudinally spaced electrode pairs 12A, 14A, 12B, 14B, 12C, 14C, 12D, 14D are provided within the pipeline 10 along the length thereof. The spacing L between the electrodes of each electrode pair 12, 14 is preferably selected as a function of the length of the fish to be harvested. In one embodiment the longitudinal spacing L between the electrodes 12, 14 of each electrode pair may correspond to the average length of the fish to be harvested.

Each electrode pair 12, 14 comprises an upstream negatively charged electrode 12 and a downstream positively charged electrode 14. As shown in FIG. 1, the electrodes 12, 14 of each pair are located on opposite sides of the pipeline 10 to generate a substantially linear electric field in the water between the each electrode pair 12,14 wherein they are connected to a respective DC supply. The electrode pairs are arranged in overlapping relationship such that the negatively charged electrode 12B of one electrode pair is located opposite the positively charged electrode 14A of an immediately preceding electrode pair while the positively charged electrode 14B is located opposite the negatively charged electrode 12C of an immediately subsequent electrode pair.

Figure 2:
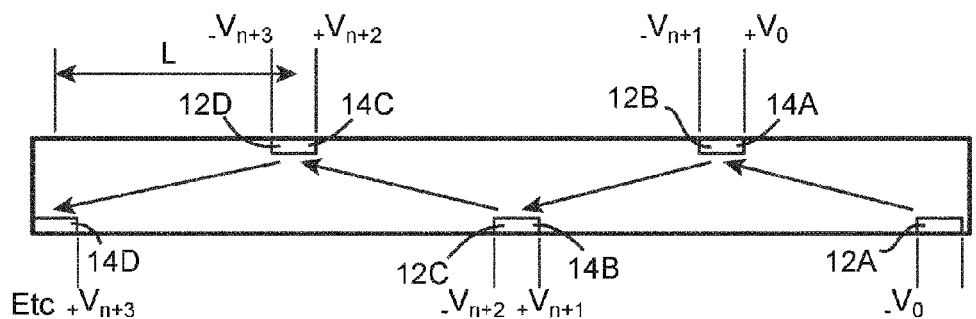
FIG. 2 is a section of a pipeline showing an alternative electrode arrangement.

In an alternative embodiment, illustrated in FIG. 2, each electrode serves as a positively charged electrode of a first electrode pair and a negatively charged electrode of a subsequent electrode pair, halving the total number of electrodes required.

In a first region of the pipeline 10, the electrode pairs are connected to a respective DC supply to generate a linear electric field in the water along the first region of the pipeline. Such electric field induces electro-anesthesia in the fish, stunning and immobilizing the fish. The voltage applied to subsequent electrode pairs within the first region may be gradually increased or increased in steps along at least a portion of said first region in a downstream direction to generate a gradually increasing voltage gradient along said portion of the first region, such that the fish are not exposed to a sudden increase in voltage gradient which might otherwise cause distress and/or muscular contractions in the fish.

In a subsequent region of the pipeline a secondary pulse DC waveform is superimposed on the DC level applied to the electrode pairs to cause medullary collapse.

In a third region of the pipeline a third pulse waveform, preferably at an increased voltage, is applied to the electrode pairs therein to maintain medullary collapse. After a controlled time the fish exit the pipeline in a dead state. The length of the third region is selected to ensure that the fish remain within such third region for at least 60 seconds, more preferably around 70 seconds, at the expected flow rate of fish through the pipeline 10.

In excess of 3 tons of fish per hour can be harvested using such apparatus. The maximum tonnage per hour is limited only by the length of the pipeline and the flow rate in the pipeline. This combination is selected to ensure that the fish remain in the pipeline for a period of at least 70 seconds.

By careful setting of the voltage applied to the respective electrode pairs in each region, no serious hemorrhaging will be found in the subsequent fillets when the fish are filleted after rigor mortis.

Figure 3:
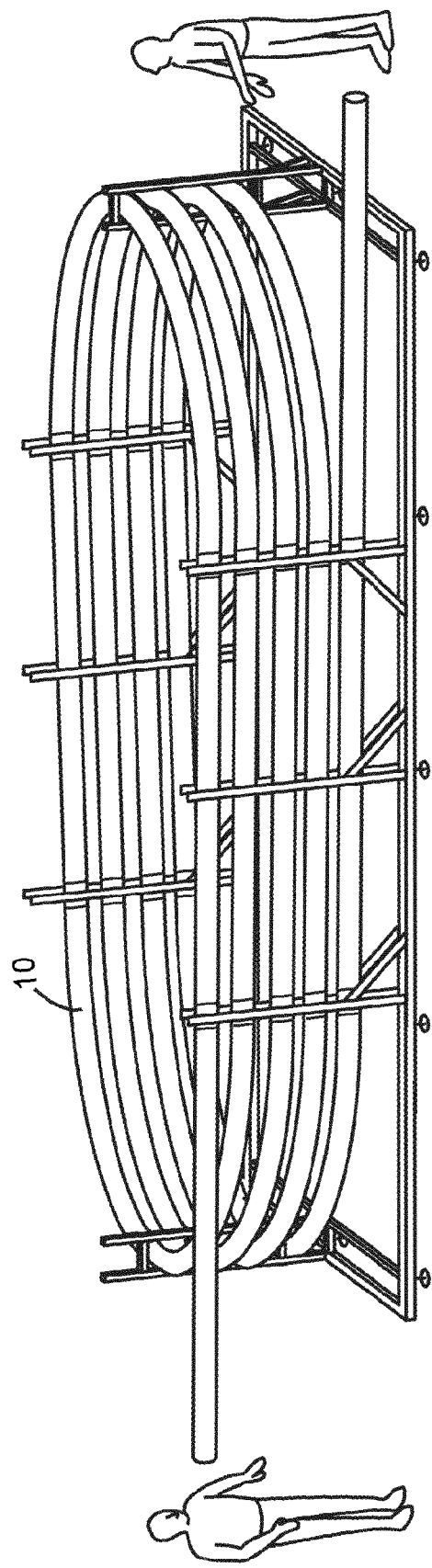
FIG. 3 is a perspective view of a land based fish slaughtering apparatus according to an embodiment of the present invention.

Preferably the pipeline 10 is provided in a coiled arrangement to minimize the space required for the pipeline, as illustrated in FIG. 3.

Figure 4:
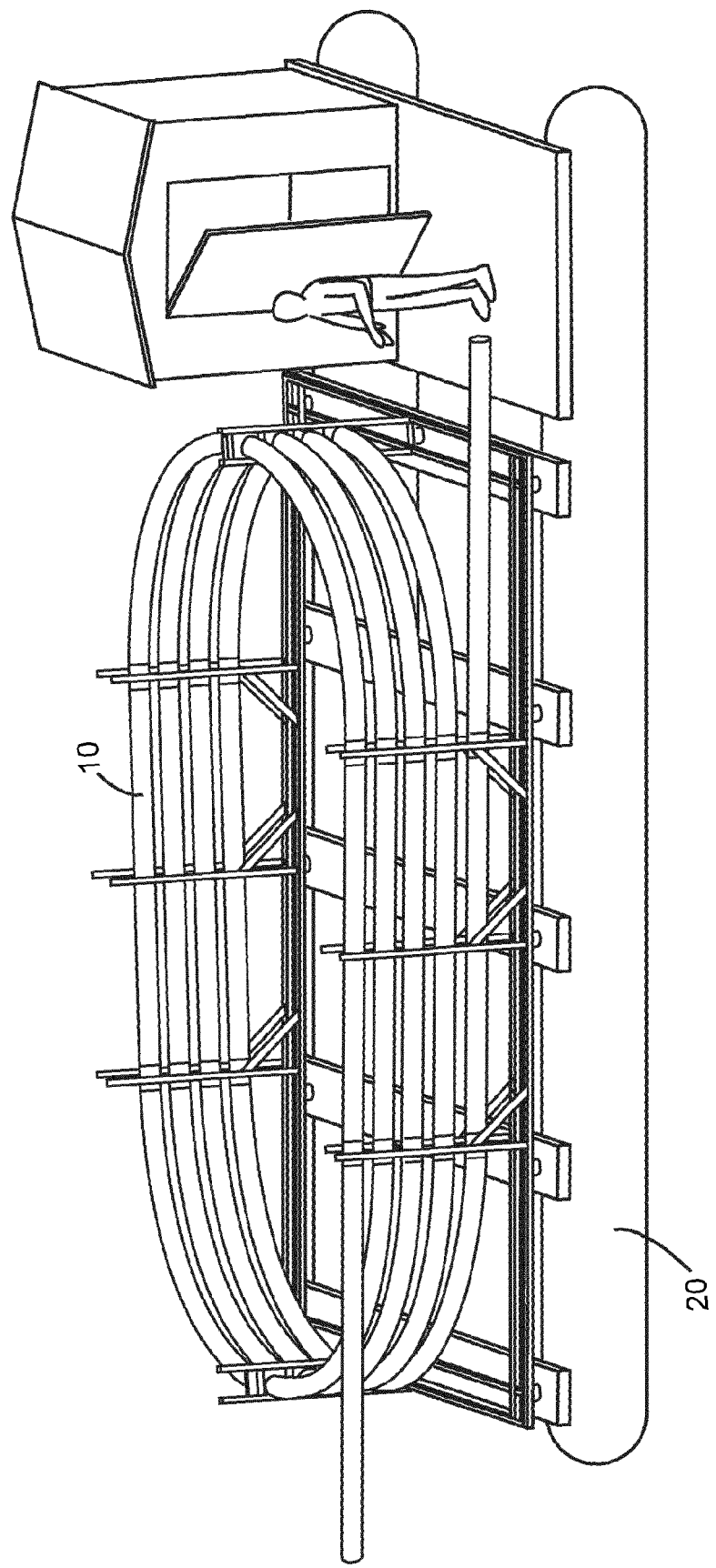
FIG. 4 is a perspective view of a floating fish slaughtering apparatus according to an embodiment of the present invention.

The pipeline may be provided on a floating platform 20, as illustrated in FIG. 4, allowing the apparatus to be located adjacent the harvesting point.

The invention eliminates fish damage by avoiding any rapid increases in voltage by utilizing slowly increasing linear electric fields along the pipeline. The electric field lengths are matched to the length of fish, by determining the spacing between the electrodes in each electrode pair as a function of the length of the fish. The voltage applied to the electrode pairs is adapted to generate overlapping longitudinal linear electrical fields along the length of the pipeline.

The innovative electric field design allows operation in low conductivities 50 uS (or lower) upwards. The invention uses a pipeline length to ensure that the fish remain in the pipeline for a period up to or exceeding 70 seconds to ensure the fish exit in a dead condition. The apparatus uses direct current (DC). Alternating current (AC) is not used, thus avoiding the problems of the prior art systems. However, it is envisaged that a DC supply may be used to induce electro-anesthesia in said first region before an AC supply is used in a subsequent region of the pipeline to kill the fish. Such might still potentially cause damage to the fish, therefore a purely DC system, with the addition of pulsed DC waveforms in downstream regions of the pipeline, is preferred.

Use of the apparatus will now be described in more detail. The fish enter the first region of the pipeline 10 wherein they pass through a first region wherein the electrode pairs are energized such that the fish are exposed to a voltage gradient in the water of around 1v/cm within 1 second of the fish entering said region. Such voltage gradient will induce immediate electro anesthesia or stunning. While in this condition the fish immediately pass to the second region with an increasing electric field. This field is generated by super imposing an increasing rectangular DC pulse upon the said 1 v/cm DC level of said first region. The resultant peak voltage is increased in steps to the required voltage gradient to ensure the fish exit the pipe in a truly dead state.

A voltage gradient of 2.5v/m or higher in the water within the second region ensures the fish exit the pipeline 10 in said dead state. Provision is made using a variable power supply to further the increase said voltage gradient to 3.5v/m or higher. In the third region the DC level is reduced to 0 in small steps, while the said rectangular DC pulse voltage is increased in corresponding small steps to maintain the established peak voltage of said second region. This rectangular pulse voltage, and subsequent voltage gradient is maintained over the remaining length of pipeline.

Provision is also made within the equipment for polarity reversal of the electrode pairs to suit either fish introduced head first or alternatively tail first. In either provision the electrodes can be switched so that the head will be facing a positive and the tail a negative electrode.

Provision is also made for the pulse frequency to be altered, typically steps from 20 pps to 1500 pps. It is well known that particular species of fish respond best to their specific frequency range.

Provision is also made for the pulse width to be adjusted, typically 10 to 50%. Reducing the pulse width reduces the power requirement of the system with increasing water conductivity.

The almost linear electric field is supplied by complimentary electrode pairs 12, 14 longitudinally spaced apart at 30 cm centers and located on opposite sides of the pipeline 10.

The number of discrete power supplies to power the electrodes may be reduced by repeated use of the pulse power supplies to subsequent electrode pairs located at non-conductive distances. Changes in the conductivity have no effect on the electric field strength, only the power required. The only operator input required is to adjust the voltage gradient to match the average fish length.

The invention is not limited to the embodiment(s) described herein but can be amended or modified without departing from the scope of the present invention.

The invention claimed is:

1. A method of slaughtering fish comprising the steps of;
providing an elongated passage, passing fish entrained within a flow of water through said passage, and
generating a linear electric field in the water along at least a first region of said passage, thereby inducing stunning of the fish passing through said first region of the passage, and
applying a further electric field in the water in a subsequent region of the passage, downstream of said first region, to kill the fish such that the fish exit a downstream end of said passage in a dead state.

2. The method as claimed in claim 1, further comprising the steps of;
providing a plurality of electrodes within said passage, said electrodes being arranged in longitudinally spaced pairs along the passage, and applying a potential difference between the electrodes of one or more electrode pairs in at least a first region of said passage via a DC supply to generate said linear electric field in the water along said at least first region of the passage.

3. The method as claimed in claim 2, further comprising the steps of;
applying a pulsed waveform to the electrodes of one or more electrode pairs in a second region of said passage downstream of said first region to generate said further electric field in the water to cause medullary collapse in fish passing through said subsequent region of the passage.

4. The method as claimed in claim 3, wherein
said pulsed waveform is applied at a higher voltage than the DC supply supplied to the electrode pairs in said first region.

5. The method as claimed in claim 4, comprising
applying said pulsed DC waveform in addition to non-pulsed potential difference applied in the first region.

6. The method as claimed in claim 4, comprising
applying an increasing voltage to subsequent electrode pairs in a downstream direction in said at least first region to generate a voltage gradient along said at least first region of the passage.

7. The method as claimed in claim 3 comprising
applying a pulsed DC waveform in a second region downstream of said first region applying a further pulsed DC waveform, at an increased voltage, in a third region, downstream of said second region.

8. The method as claimed in claim 7, comprising
applying said pulsed DC waveform in addition to non-pulsed potential difference applied in the first region.

9. The method as claimed in claim 7, comprising
applying an increasing voltage to subsequent electrode pairs in a downstream direction in said at least first region to generate a voltage gradient along said at least first region of the passage.

10. The method as claimed in claim 3, comprising
applying said pulsed DC waveform in addition to the non-pulsed potential difference applied in the first region.

11. The method as claimed in claim 10, comprising
applying an increasing voltage to subsequent electrode pairs in a downstream direction in said at least first region to generate a voltage gradient along said at least first region of the passage.

12. The method as claimed in claim 3, comprising
applying an increasing voltage to subsequent electrode pairs in a downstream direction in said at least first region to generate a voltage gradient along said at least first region of the passage.

13. The method as claimed in claim 2, comprising
applying an increasing voltage to subsequent electrode pairs in a downstream direction in said at least first region to generate a voltage gradient along said at least first region of the passage.

14. An apparatus for slaughtering fish comprising:
an elongated passage through which a flow of water containing fish can be passed, a plurality of electrodes being located within said passage, said electrodes being arranged in longitudinally spaced pairs, one or more electrode pairs in a first region of said passage being connectable to a DC supply to generate a linear electric field in the water in said first region to induce stunning in fish passing through said first region of the passage, a plurality of electrode pairs in a subsequent region of the passage, downstream of said first region, being connectable to a power supply to generate an electric field in the water in said subsequent region to kill the fish, such that the fish exit a downstream end of said passage in a dead state.

15. The apparatus as claimed in claim 14, wherein
said plurality of electrode pairs in said subsequent region of the passage are connected to one or more DC power supplies.

16. The apparatus as claimed in claim 15, wherein
a plurality of discrete DC power supplies are provided for respectively supplying power to subsequent electrode pairs in said subsequent region of the passage.

17. The apparatus as claimed in claim 15, wherein
each electrode pair in at least said first region of the pipeline comprises an upstream negatively charged electrode and a downstream positively charged electrode, such that fish are attracted to the positively charged electrode encouraging the fish to move in a downstream direction through the pipeline.

18. The apparatus as claimed in claim 14, wherein
each electrode pair in at least said first region of the pipeline comprises an upstream negatively charged electrode and a downstream positively charged electrode, such that fish are attracted to the positively charged electrode encouraging the fish to move in a downstream direction through the pipeline.

* * * * *